United States Patent
Linhardt et al.

(10) Patent No.: US 9,841,614 B2
(45) Date of Patent: Dec. 12, 2017

(54) FLEXIBLE CONDUCTOR FOR USE WITHIN A CONTACT LENS

(71) Applicant: VERILY LIFE SCIENCES LLC, Mountain View, CA (US)

(72) Inventors: Jeffrey G. Linhardt, Pleasanton, CA (US); Zenghe Liu, Alameda, CA (US); Scott B. Kennedy, Mountain View, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 111 days.

(21) Appl. No.: 14/701,360

(22) Filed: Apr. 30, 2015

(65) Prior Publication Data

US 2015/0362752 A1    Dec. 17, 2015

Related U.S. Application Data

(60) Provisional application No. 62/012,005, filed on Jun. 13, 2014, provisional application No. 62/012,017, filed on Jun. 13, 2014.

(51) Int. Cl.
*G02C 7/08* (2006.01)
*G02C 7/04* (2006.01)

(52) U.S. Cl.
CPC ............... *G02C 7/083* (2013.01); *G02C 7/04* (2013.01)

(58) Field of Classification Search
CPC ........ G02C 7/101; G02C 7/165; G02C 7/083; G02B 27/0172
See application file for complete search history.

(56) References Cited

U.S. PATENT DOCUMENTS 6,859,333 B1    2/2005    Ren et al.
7,311,398 B2    12/2007   Kuiper et al.
(Continued)

FOREIGN PATENT DOCUMENTS

EP    2 518 555 A1    10/2012
WO    WO 2013/086078 A1    6/2013
(Continued)

OTHER PUBLICATIONS

De Smet, J. et al., "Progress toward a liquid crystal contact lens display", Journal of the SID 21/9, DOI: 10.1002/jsid.188, 2014 pp. 399-406.
(Continued)

*Primary Examiner* — Phu Vu
(74) *Attorney, Agent, or Firm* — Christensen O'Connor Johnson Kindness PLLC

(57) ABSTRACT

An eye-mountable device includes a flexible lens enclosure, anterior and posterior flexible conductive electrodes, and an accommodation actuator element. The flexible lens enclosure includes anterior and posterior layers that are sealed together. The anterior flexible conductive electrode is disposed within the flexible enclosure and across a center region of the flexible lens enclosure on a concave side of the anterior layer. The posterior flexible conductive electrode is disposed within the flexible enclosure and across the center region on a convex side of the posterior layer. The accommodation actuator element is disposed between the first and second flexible conductive electrodes. The anterior and posterior flexible conductive electrodes are transparent and electrically manipulate the accommodation actuator element.

21 Claims, 5 Drawing Sheets

(56) References Cited

U.S. PATENT DOCUMENTS

| | | |
|---|---|---|
| 8,154,804 B2 | 4/2012 | McGinn et al. |
| 8,634,145 B2 | 1/2014 | Pugh et al. |
| 8,636,358 B2 | 1/2014 | Binder |
| 8,906,088 B2 | 12/2014 | Pugh et al. |
| 2005/0073739 A1 | 4/2005 | Meredith et al. |
| 2008/0208335 A1 | 8/2008 | Blum et al. |
| 2010/0157180 A1* | 6/2010 | Doane ............... G02F 1/1334 349/25 |
| 2011/0116035 A1 | 5/2011 | Fritsch et al. |
| 2011/0227851 A1* | 9/2011 | Oh .................. G02F 1/13338 345/173 |
| 2012/0075712 A1 | 3/2012 | Pugh et al. |
| 2012/0120365 A1 | 5/2012 | Legerton et al. |
| 2012/0140167 A1 | 6/2012 | Blum |
| 2012/0235277 A1* | 9/2012 | Pugh ..................... G02C 11/10 257/532 |
| 2012/0236417 A1 | 9/2012 | Pugh et al. |
| 2012/0245444 A1 | 9/2012 | Otis et al. |
| 2012/0268712 A1 | 10/2012 | Egan et al. |
| 2012/0300171 A1 | 11/2012 | Gupta et al. |
| 2013/0083405 A1* | 4/2013 | Trajkovska ............ H01B 1/124 359/642 |
| 2013/0194540 A1* | 8/2013 | Pugh ..................... A61F 2/1635 351/159.03 |
| 2013/0245754 A1 | 9/2013 | Blum et al. |
| 2013/0258275 A1 | 10/2013 | Toner et al. |
| 2013/0258277 A1 | 10/2013 | Pugh et al. |
| 2013/0338767 A1 | 12/2013 | Mazzocchi et al. |
| 2014/0098226 A1 | 4/2014 | Pletcher et al. |
| 2014/0107447 A1 | 4/2014 | Liu et al. |
| 2014/0107448 A1 | 4/2014 | Liu et al. |
| 2014/0192311 A1 | 7/2014 | Pletcher et al. |
| 2014/0192312 A1 | 7/2014 | Pletcher et al. |
| 2014/0192318 A1 | 7/2014 | Guth et al. |
| 2014/0194773 A1 | 7/2014 | Pletcher et al. |
| 2014/0209481 A1 | 7/2014 | Pletcher et al. |
| 2014/0213867 A1 | 7/2014 | Pletcher et al. |
| 2014/0240655 A1 | 8/2014 | Pugh et al. |
| 2014/0243971 A1 | 8/2014 | Pugh et al. |
| 2014/0253870 A1 | 9/2014 | Jiang et al. |
| 2014/0327875 A1 | 11/2014 | Blum et al. |
| 2015/0029424 A1* | 1/2015 | Gordon ................. G02C 7/083 349/13 |
| 2015/0077658 A1* | 3/2015 | Pugh ..................... G02C 7/083 349/13 |

FOREIGN PATENT DOCUMENTS

| | | |
|---|---|---|
| WO | WO 2015/015205 A1 | 2/2015 |
| WO | 2015/191247 A1 | 12/2015 |

OTHER PUBLICATIONS

De Smet, J. et al., "A Liquid Crystal Based Contact Lens Display Using PEDOT: PSS and Obliquely Evaporated SiO2", Late-News Poster, SID 2012 Digest, pp. 1375-1378.

Milton, H. et al., "Optimization of refractive liquid crystal lenses using an efficient multigrid simulation", May 2012, vol. 20, No. 10, Optics Express, pp. 11159-11165.

Milton, H. et al., "Switchable liquid crystal contact lenses: dynamic vision for the ageing eye", Proc. of SPIE vol. 9004 90040H, 6 pages. Downloaded From: http://spiedigitallibrary.org/ on Mar. 28, 2014.

Milton, H. et al., "Electronic liquid crystal contact lenses for the correction of presbyopia", Apr. 2014, vol. 22, No. 7, DOI:10.1364/OE.22.008035, Optics Express, pp. 8035-8040.

Tremblay, E. et al. "Switchable telescopic contact lens", Jul. 2013, vol. 21, No. 13, DOI:10.1364/OE.21.015980, Optics Express, pp. 15980-15986.

PCT/US2015/031233—International Search Report and Written Opinion, dated Aug. 20, 2015, 15 pages.

AU 2015275151—First Examination Report dated Jul. 11, 2017, 3 pages.

CA 2,950,560—First Examination Report dated Aug. 16, 2017, 3 pages.

AU 2015275156—First Examination Report dated Sep. 11, 2017, 3 pages.

* cited by examiner

FLEXIBLE CONDUCTOR FOR USE WITHIN A CONTACT LENS

CROSS REFERENCE TO RELATED APPLICATIONS

This application claims priority under the provisions of 35 U.S.C. §119(e) to U.S. Provisional Application No. 62/012,005, filed on Jun. 13, 2014, entitled "Accommodating Lens," and to U.S. Provisional Application No. 62/012,017, filed on Jun. 13, 2014, entitled "Accommodating Lens Optics and Materials," both contents of which are hereby incorporated by reference.

TECHNICAL FIELD

This disclosure relates generally to the field of optics, and in particular but not exclusively, relates to contact lenses.

BACKGROUND INFORMATION

Accommodation is a process by which the eye adjusts its focal distance to maintain focus on objects of varying distance. Accommodation is a reflex action, but can be consciously manipulated. Accommodation is controlled by contractions of the ciliary muscle. The ciliary muscle encircles the eye's elastic lens and applies a force on the elastic lens during muscle contractions that change the focal point of the elastic lens.

As an individual ages, the effectiveness of the ciliary muscle degrades. Presbyopia is a progressive age-related loss of accommodative or focusing strength of the eye, which results in increased blur at near distances. This loss of accommodative strength with age has been well studied and is relatively consistent and predictable. Presbyopia affects nearly 1.7 billion people worldwide today (110 million in the United States alone) and that number is expected to substantially rise as the world's population ages. Techniques and devices that can help individuals offset the effects of Presbyopia are increasingly in demand.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Figure 1:
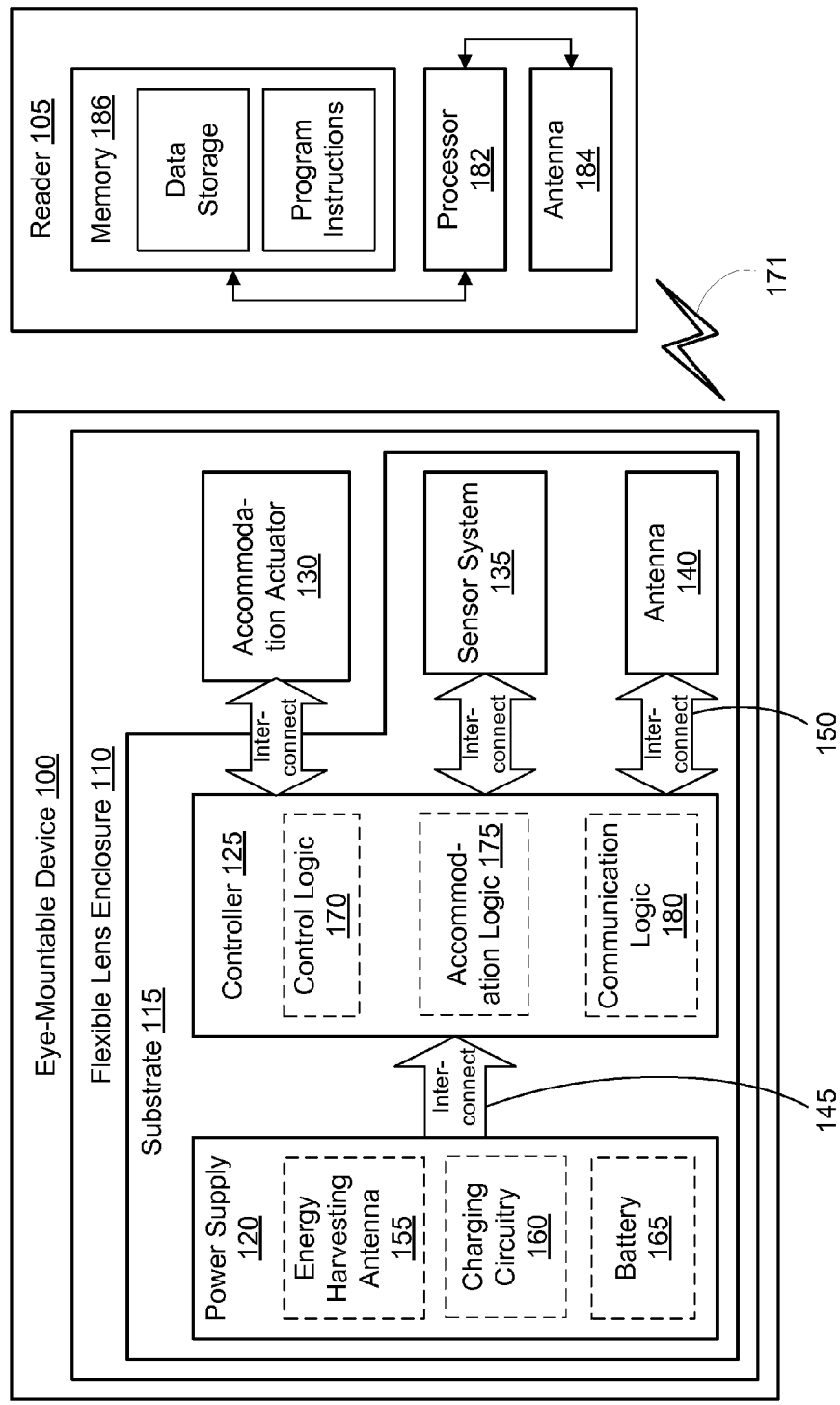
FIG. 1 is a functional block diagram of an eye-mountable device that provides auto-accommodation and an external reader for interacting with the eye-mountable device, in accordance with an embodiment of the disclosure.

Embodiments of a system, apparatus, and method of fabrication for an eye-mountable device including one or more flexible conductive layers are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein is a smart contact lens or eye-mountable device that includes an accommodation actuator for adjusting the focal distance of the contact lens. In some embodiments, the accommodation is automatically adjusted in real-time based upon a user's gazing direction. The accommodation actuator is disposed in a center region of the smart contact lens (e.g., covering at least the foveal vision). As such, it is desirable that the structural and electronic components of the accommodation actuator do not unduly obstruct or deteriorate the quality of the user's center of vision.

The accommodation actuator may be implemented with various optoelectronic devices, but each will require electrodes to electronically control the accommodation actuator. Accordingly, these electrodes should be transparent, as well as, conductive. The high electrical conductivity and optical transparency of indium tin oxide ("ITO") have earned this material its place as the standard transparent conducting material in the optoelectronic device industry. However, conventional ITO is brittle and therefore not well suited for a flexible contact lens. The brittleness of ITO dramatically decreases its electrical conductivity upon bending or folding. Since flexible contact lenses experience numerous mechanical folding and bending cycles when manipulated, inserted, and worn by a user, the brittleness of conventional ITO is not desirable.

Embodiments of the instant disclosure address the drawbacks of using ITO in a flexible contact lens by using a transparent, flexible, conductive material to form electrodes for manipulating the optoelectronic accommodation actuator. In various embodiments, the flexible conductive electrode material is solvent-based and can be applied through stenciled spraying techniques, stamp coating processes, or otherwise. The materials used to form the liquid conductor material includes a colloidal suspension of conductive particles that is cured in place on the flexible enclosure material of the smart contact lens. Example conductive particles include carbon nanotubes and metal nanowires (e.g., silver nanowires). In other embodiments, the liquid conductor material may be a conductive polymer or conductive silicon.

Embodiments of the eye-mountable device may include a power supply, control electronics, an accommodation actuator, a gaze direction sensor system, and an antenna all embedded within a flexible lens enclosure formed to be contact mounted to an eye (e.g., shaped to be removeably mounted to a cornea and allow eyelid motion to open and close). In one embodiment, the control electronics are coupled to monitor the sensor system to identify gaze direction/focal distance, manipulate the accommodation actuator to control the optical power of the eye-mountable device, and provide wireless communications with an external reader. In some embodiments, the power supply may include charging circuitry for controlling inductive wireless charging of an embedded battery.

The flexible lens enclosure may be fabricated of a variety of materials compatible for direct contact with a human eye, such as a polymeric material, a hydrogel, PMMA, silicone based polymers (e.g., fluoro-silicone acrylate), or otherwise. The electronics can be disposed upon a ring substrate embedded within the flexible lens enclosure near its periphery to avoid interference with incident light received closer to the central region of the cornea. The sensor system can be arranged on the substrate to face outward towards the eyelids to detect the gaze direction/focal distance based upon the amount and position of eyelid coverage over the sensor system. As the eyelids cover different portions of the sensor system, this changes a characteristic (e.g., its capacitance), which can be measured to determine gaze direction and/or focal distance.

In some embodiments, the gaze direction/focal distance information can then be used to determine the amount of accommodation to be applied via a see-through accommodation actuator positioned in a central portion of the flexible lens enclosure. The accommodation actuator is coupled to the controller to be electrically manipulated thereby via the application of a voltage across a pair of flexible conductive electrodes. For example, the accommodation actuator may be implemented with a liquid crystal cell that changes its index of refraction in response to an applied electrical bias signal across the flexible conductive electrodes. In other embodiments, the accommodation actuator may be implemented using other types of electro-active materials such as electro-optic materials that vary refractive index in the presence of an applied electric field or electro-mechanical structures that change the shape of a deformable lens. Other example structures that may be used to implement the accommodation actuator include electro-wetting optics, micro-electro-mechanical systems, or otherwise.

FIG. 1 is a functional block diagram of an eye-mountable device 100 with gaze tracking for auto-accommodation along with an external reader 105, in accordance with an embodiment of the disclosure. The exposed portion of eye-mountable device 100 is a flexible lens enclosure 110 formed to be contact-mounted to a corneal surface of an eye. A substrate 115 is embedded within or surrounded by flexible lens enclosure 110 to provide a mounting surface for a power supply 120, a controller 125, a sensor system 135, an antenna 140, and various interconnects 145 and 150. An accommodation actuator 130 is embedded within flexible lens enclosure 110 and coupled to controller 125 to provide auto-accommodation to the wearer of eye-mountable device 100. The illustrated embodiment of power supply 120 includes an energy harvesting antenna 155, charging circuitry 160, and a battery 165. The illustrated embodiment of controller 125 includes control logic 170, accommodation logic 175, and communication logic 180. The illustrated embodiment of reader 105 includes a processor 182, an antenna 184, and memory 186.

Controller 125 is coupled to receive feedback control signals from sensor system 135 and further coupled to operate accommodation actuator 130. Power supply 120 supplies operating voltages to the controller 125 and/or the accommodation actuator 130. Antenna 140 is operated by the controller 125 to communicate information to and/or from eye-mountable device 100. In one embodiment, antenna 140, controller 125, power supply 120, and sensor system 135 are all situated on the embedded substrate 115. In one embodiment, accommodation actuator 130 is embedded within a center region of flexible lens enclosure 110, but is not disposed on substrate 115. Because eye-mountable device 100 includes electronics and is configured to be contact-mounted to an eye, it is also referred to herein as an ophthalmic electronics platform, a contact lens, or a smart contact lens.

To facilitate contact-mounting, the flexible lens enclosure 110 can have a concave surface configured to adhere ("mount") to a moistened corneal surface (e.g., by capillary forces with a tear film coating the corneal surface). Additionally or alternatively, the eye-mountable device 100 can be adhered by a vacuum force between the corneal surface and flexible lens enclosure 110 due to the concave curvature. While mounted with the concave surface against the eye, the outward-facing surface of flexible lens enclosure 110 can have a convex curvature that is formed to not interfere with eye-lid motion while the eye-mountable device 100 is mounted to the eye. For example, flexible lens enclosure 110 can be a substantially transparent curved disk shaped similarly to a contact lens.

Flexible lens enclosure 110 can include one or more biocompatible materials, such as those employed for use in contact lenses or other ophthalmic applications involving direct contact with the corneal surface. Flexible lens enclosure 110 can optionally be formed in part from such biocompatible materials or can include an outer coating with such biocompatible materials. Flexible lens enclosure 110 can include materials configured to moisturize the corneal surface, such as hydrogels and the like. Flexible lens enclosure 110 is a deformable ("non-rigid") material to enhance wearer comfort. In some instances, flexible lens enclosure 110 can be shaped to provide a predetermined, vision-correcting optical power, such as can be provided by a contact lens. Flexible lens enclosure 110 may be fabricated of various materials including a polymeric material, a hydrogel, PMMA, silicone based polymers (e.g., fluoro-silicon acrylate), or otherwise.

Substrate 115 includes one or more surfaces suitable for mounting sensor system 135, controller 125, power supply 120, and antenna 140. Substrate 115 can be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide or the flexible conductive materials discussed below) can be patterned on substrate 115 to form circuitry, electrodes, etc. For example, antenna 140 can be formed by depositing a pattern of gold or another conductive material on substrate 115. Similarly, interconnects 145 and 150 can be formed by depositing suitable patterns of conductive materials on substrate 115. A combination of resists, masks, and deposition techniques can be employed to pattern materials on substrate 115. Substrate 115 can be a relatively rigid material, such as polyethylene terephthalate ("PET") or another material sufficient to structurally support the circuitry and/or electronics within enclosure material 110. Eye-mountable device 100 can alternatively be arranged with a group of unconnected substrates rather than a single substrate. For example, controller 125 and power supply 120 can be mounted to one substrate, while antenna 140 and sensor system 135 are mounted to another substrate and the two can be electrically connected via interconnects.

Substrate 115 can be shaped as a flattened ring with a radial width dimension sufficient to provide a mounting platform for the embedded electronics components. Substrate 115 can have a thickness sufficiently small to allow the substrate to be embedded in flexible lens enclosure 110 without adversely influencing the profile of eye-mountable device 100. Substrate 115 can have a thickness sufficiently large to provide structural stability suitable for supporting the electronics mounted thereon. For example, substrate 115 can be shaped as a ring with a diameter of about 10 millimeters, a radial width of about 1 millimeter (e.g., an outer radius 1 millimeter larger than an inner radius), and a thickness of about 50 micrometers. Substrate 115 can optionally be aligned with the curvature of the eye-mounting surface of eye-mountable device 100 (e.g., convex surface). For example, substrate 115 can be shaped along the surface of an imaginary cone between two circular segments that define an inner radius and an outer radius. In such an example, the surface of substrate 115 along the surface of the imaginary cone defines an inclined surface that is approximately aligned with the curvature of the eye mounting surface at that radius.

In some embodiments, power supply 120 and controller 125 (and the substrate 115) can be positioned away from the center of eye-mountable device 100 and thereby avoid interference with light transmission to the eye through the center of eye-mountable device 110. In contrast, accommodation actuator 130 can be centrally positioned to apply optical accommodation to the light transmitted to the eye through the center of eye-mountable device 110. For example, where eye-mountable device 100 is shaped as a concave-curved disk, substrate 115 can be embedded around the periphery (e.g., near the outer circumference) of the disk. In some embodiments, sensor system 135 includes one or more discrete capacitance sensors that are peripherally distributed to sense the eyelid overlap.

In the illustrated embodiment, power supply 120 includes a battery 165 to power the various embedded electronics, including controller 125. Battery 165 may be inductively charged by charging circuitry 160 and energy harvesting antenna 155. In one embodiment, antenna 140 and energy harvesting antenna 155 are independent antennae, which serve their respective functions of energy harvesting and communications. In another embodiment, energy harvesting antenna 155 and antenna 140 are the same physical antenna that are time shared for their respective functions of inductive charging and wireless communications with reader 105. Charging circuitry 160 may include a rectifier/regulator to condition the captured energy for charging battery 165 or directly power controller 125 without battery 165. Charging circuitry 160 may also include one or more energy storage devices to mitigate high frequency variations in energy harvesting antenna 155. For example, one or more energy storage devices (e.g., a capacitor, an inductor, etc.) can be connected to function as a low-pass filter.

Controller 125 contains logic to choreograph the operation of the other embedded components. Control logic 170 controls the general operation of eye-mountable device 100, including providing a logical user interface, power control functionality, etc. Accommodation logic 175 includes logic for monitoring feedback signals from sensor system 135, determining the current gaze direction or focal distance of the user, and manipulating accommodation actuator 130 in response to provide the appropriate accommodation. The auto-accommodation can be implemented in real-time based upon feedback from the gaze tracking, or permit user control to select specific accommodation regimes (e.g., near-field accommodation for reading, far-field accommodation for regular activities, etc.). Communication logic 180 provides communication protocols for wireless communication with reader 105 via antenna 140. In one embodiment, communication logic 180 provides backscatter communication via antenna 140 when in the presence of an electromagnetic field 171 output from reader 105. In one embodiment, communication logic 180 operates as a smart wireless radio-frequency identification ("RFID") tag that modulates the impedance of antenna 140 for backscatter wireless communications. The various logic modules of controller 125 may be implemented in software/firmware executed on a general purpose microprocessor, in hardware (e.g., application specific integrated circuit), or a combination of both.

Eye-mountable device 100 may include various other embedded electronics and logic modules. For example, a light source or pixel array may be included to provide visible feedback to the user. An accelerometer or gyroscope may be included to provide positional, rotational, directional or acceleration feedback information to controller 125.

Figure 2A:
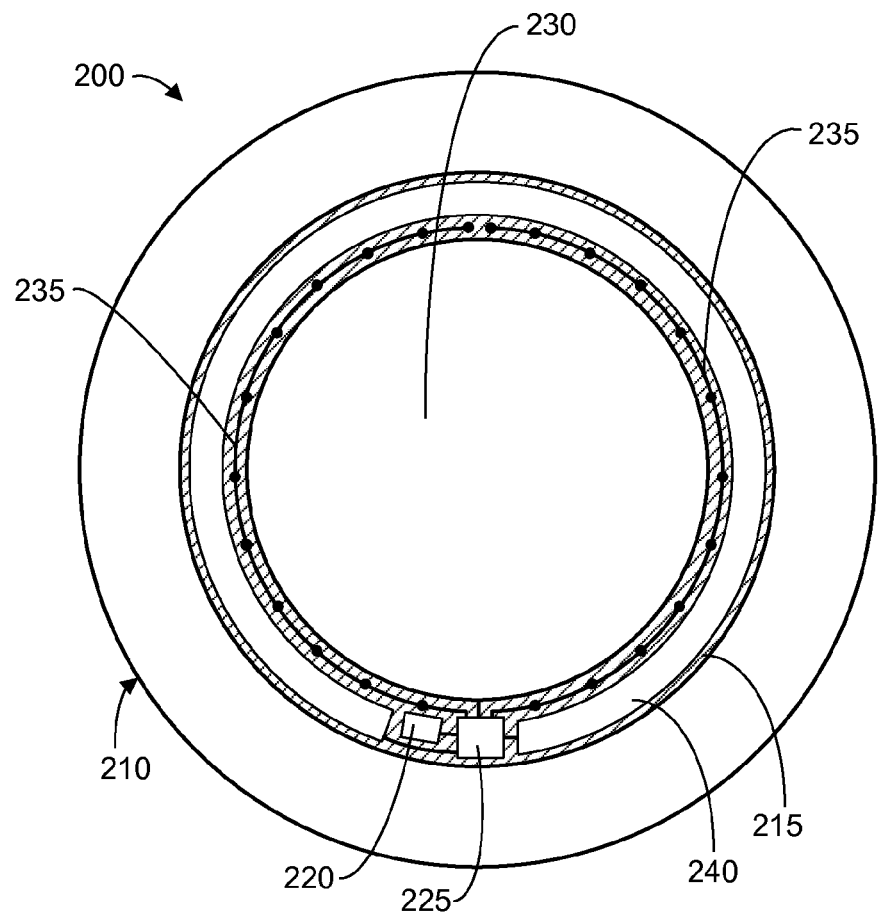
FIG. 2A is a top view illustration of an eye-mountable device, in accordance with an embodiment of the disclosure.
Figure 2B:
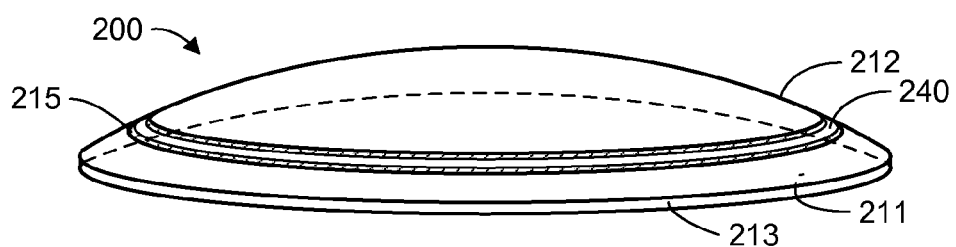
FIG. 2B is a perspective view illustration of an eye-mountable device, in accordance with an embodiment of the disclosure.

FIGS. 2A and 2B illustrate two views of an eye-mountable device 200, in accordance with an embodiment of the disclosure. FIG. 2A is a top view of eye-mountable device 200 while FIG. 2B is a perspective view of the same. Eye-mountable device 200 is one possible implementation of eye-mountable device 100 illustrated in FIG. 1. The illustrated embodiment of eye-mountable device 200 includes a flexible lens enclosure 210, a ring substrate 215, a power supply 220, a controller 225, an accommodation actuator 230, a capacitive sensor system 235, and an antenna 240. It should be appreciated that FIGS. 2A and 2B are not necessarily drawn to scale, but have been illustrated for purposes of explanation only in describing the arrangement of the example eye-mountable device 200.

Flexible lens enclosure 210 of eye-mountable device 200 is shaped as a curved disk. Flexible lens enclosure 210 is formed with one side having a concave surface 211 suitable to fit over a corneal surface of an eye. The opposite side of the disk has a convex surface 212 that does not interfere with eyelid motion while eye-mountable device 200 is mounted to the eye. In the illustrated embodiment, a circular or oval outer side edge 213 connects the concave surface 211 and convex surface 212.

Eye-mountable device 200 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of eye-mountable device 200 can be selected according to the size and/or shape of the corneal surface of the wearer's eye. Flexible lens enclosure 210 can be formed with a curved shape in a variety of ways. For example, techniques similar to those employed to form vision-correction contact lenses, such as heat molding, injection molding, spin casting, etc. can be employed to form flexible lens enclosure 210.

Ring substrate 215 is embedded within flexible lens enclosure 210. Ring substrate 215 can be embedded to be situated along the outer periphery of flexible lens enclosure 210, away from the central region where accommodation actuator 230 is positioned. In the illustrated embodiment, ring substrate 215 encircles accommodation actuator 230. Ring substrate 215 does not interfere with vision because it is too close to the eye to be in focus and is positioned away from the central region where incident light is transmitted to the light-sensing portions of the eye. In some embodiments, ring substrate 215 can optionally be formed of a transparent material to further mitigate effects on visual perception. Ring substrate 215 can be shaped as a flat, circular ring (e.g., a disk with a centered hole). The flat surface of ring substrate 215 (e.g., along the radial width) is a platform for mounting electronics and for patterning conductive materials to form electrodes, antenna(e), and/or interconnections.

Capacitive sensor system 235 is distributed about eye-mountable device 200 to sense eyelid overlap in a manner similar to capacitive touch screens. By monitoring the amount and position of eyelid overlap, feedback signals from capacitive sensor system 235 can be measured by controller 225 to determine the approximate gaze direction and/or focal distance. In the illustrated embodiment, capacitive sensor system 235 is formed by a series of parallel coupled discrete capacitive elements. Other implementations may be used.

Accommodation actuator 230 is centrally positioned within flexible lens enclosure 210 to affect the optical power of eye-mountable device 200 in the user's center of vision. In various embodiments, accommodation actuator 230 includes an element that changes its index of refraction under the influence of flexible conductive electrodes manipulated by controller 225. By changing its refractive index, the net optical power of the curved surfaces of eye-mountable device 200 is altered, thereby applying controllable accommodation. Accommodation actuator 230 may be implemented using a variety of different optoelectronic elements. For example, accommodation actuator 230 may be implemented using a layer of liquid crystal (e.g., a liquid crystal cell) disposed in the center of flexible lens enclosure 210. In other embodiments, accommodation actuator 230 may be implemented using other types of electro-active optical materials such as electro-optic materials that vary refractive index in the presence of an applied electric field. Accommodation actuator 230 may be a distinct device embedded within enclosure material 210 (e.g., liquid crystal cell), or a bulk material having a controllable refractive index. In yet another embodiment, accommodation actuator 230 may be implemented using a deformable lens structure that changes shape under the influence of an electrical signal. Accordingly, the optical power of eye-mountable device 200 is controlled by controller 225 with the application of electric signals via one or more electrodes extending from controller 225 to accommodation actuator 230.

Figure 3:
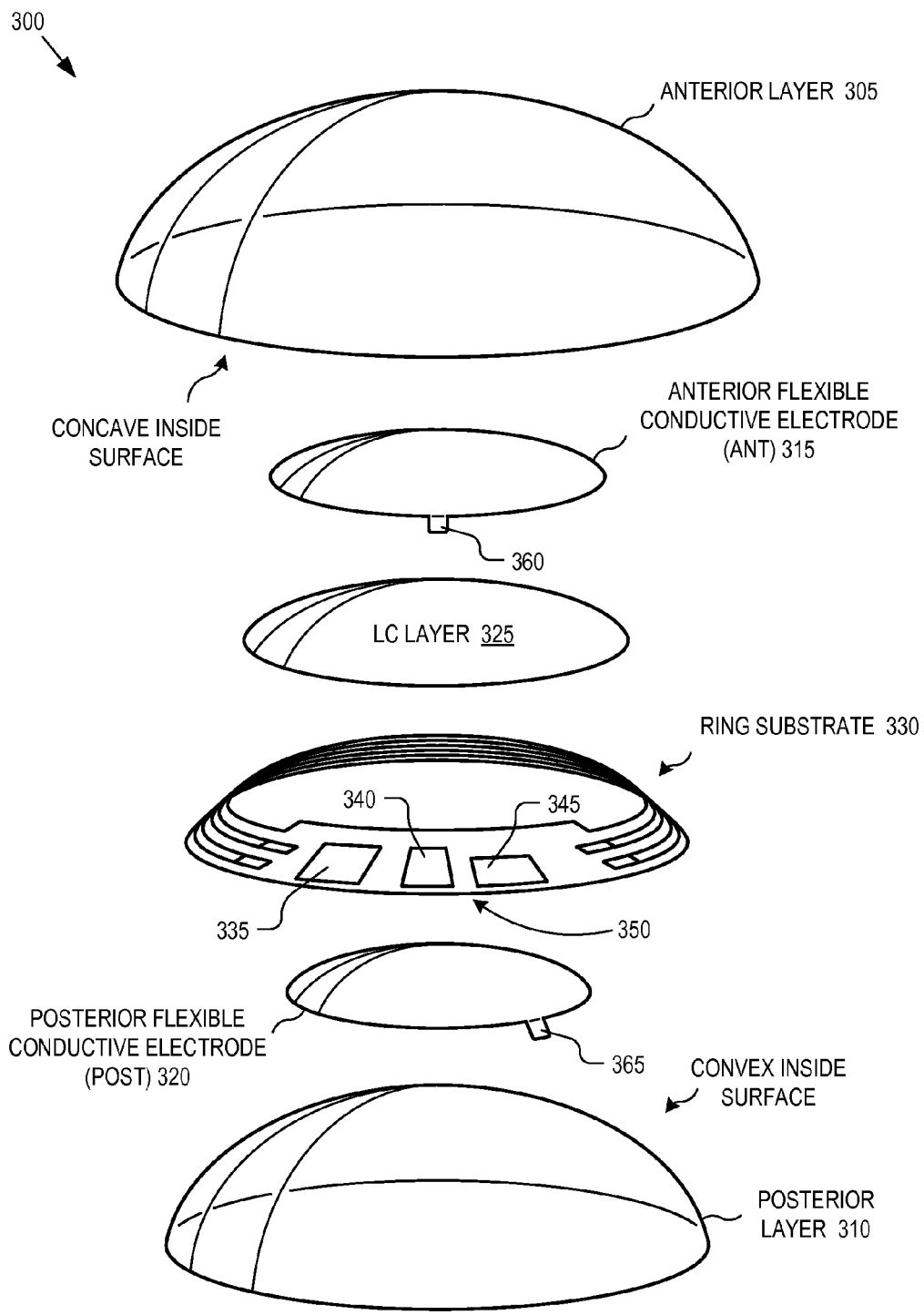
FIG. 3 is an exploded perspective view that illustrates the various components and layers of an eye-mountable device, in accordance with an embodiment of the disclosure.

FIG. 3 is an explode perspective view illustrating an eye-mountable device 300, in accordance with an embodiment of the disclosure. Eye-mountable device 300 is one possible implementation of eye-mountable devices 100 or 200, but the exploded perspective illustration shows additional details of various components. The illustrated embodiment of eye-mountable device 300 includes a flexible lens enclosure including an anterior layer 305 and a posterior layer 310, an anterior flexible conductive electrode (ANT) 315, a posterior flexible conductive electrode (POST) 320, a liquid crystal ("LC") layer 325, a ring substrate 330, a power supply 335, a controller circuit 340, an anterior contact pad 345, and a posterior contact pad 350 (hidden in FIG. 3). Collectively, the ANT 315, LC layer 325, and POST 320 form an accommodation actuator that is manipulated under the influence of controller circuit 340. The illustrated embodiment of ANT 315 includes a connection tab 360 and the illustrated embodiment of POST 320 includes a connection tab 365.

ANT 315 and POST 320 are transparent electrodes that electrically manipulate LC layer 325 via the application of a voltage across the electrodes. ANT 315 and POST 320 are flexible conductors that substantially maintain their conductivity even in the presence of cyclical mechanical stressing including folding and bending. ANT 315 and POST 320 are formed from a liquid conductor material that is cured onto, and therefore conform to, the curved surfaces of anterior layer 305 and posterior layer 310, respectively. For example, this liquid conductor material may be colloidal suspension of conductive particles. These conductive particles can include carbon nanotubes, metal nanowires (e.g., silver nanowires), or otherwise. In other embodiments, the liquid conductor material may be a conductive polymer or conductive silicon.

ANT 315 and POST 320 can be applied to anterior layer 305 and posterior layer 310, respectively, using a variety of techniques. In one embodiment, the liquid conductor material is spray coated on the inside concave surface of anterior layer 305 using a conforming concave stencil and is also spray coated on the inside convex surface of posterior layer 310 using a conforming convex stencil. In other embodiments, the spray coating may be actively controlled without use of stencils, or applied after application of a temporary mask. In yet other embodiments, the liquid conductor material is coated onto a stamp with a conforming shaped surface that is then pressed to anterior layer 305 or posterior layer 310 to transfer the liquid conductor material. Other application techniques may also be used to form and position ANT 315 and POST 320 onto anterior layer 305 and posterior layer 310, respectively.

In one embodiment, ANT 315 and POST 320 are formed as part of an iterative process of material application and curing/annealing that builds up multiple layers to achieve a desired total sheet resistance. Target sheet resistances may range between 100 ohms/square to 2000 ohms/square (e.g., 190 ohms/square). Of course, other target sheet resistances outside this range may also be used. The number of application and curing iterations to achieve a desired target sheet resistance may range between 1 to 10 iterations, but is expected to typically range between 1 to 4 applications.

Figure 4A:
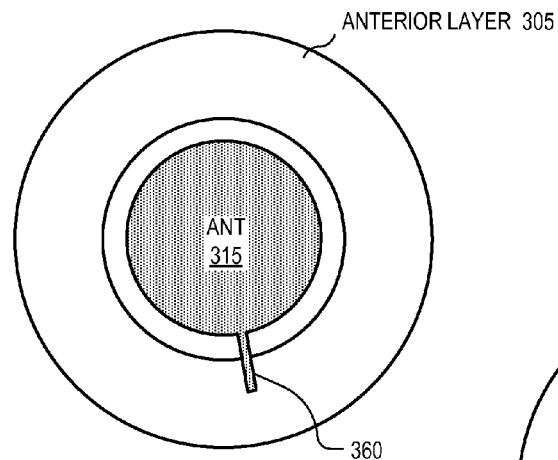
FIGS. 4A-4C illustrate orientations of flexible conductive electrodes within the eye-mountable device, in accordance with an embodiment of the disclosure.
Figure 4B:
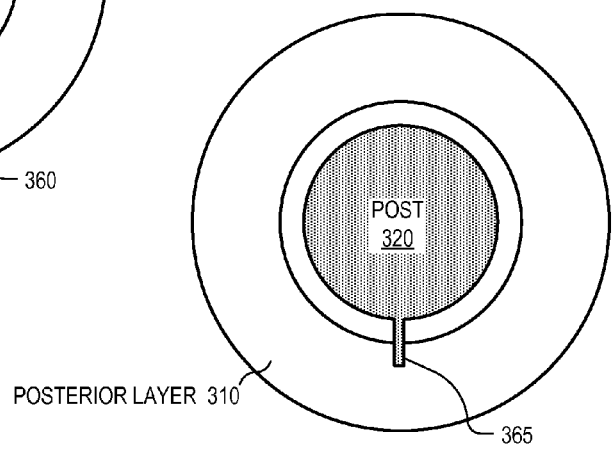
Figure 4C:
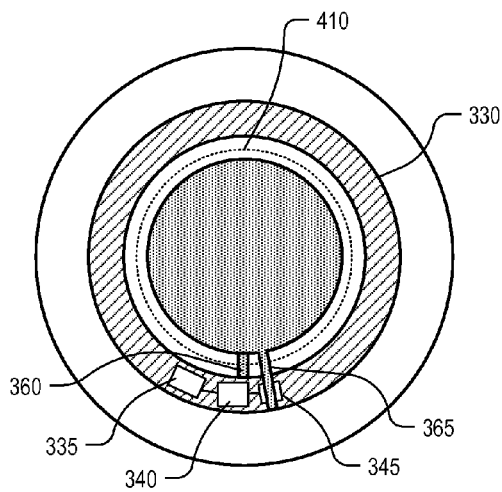
Figure 5:
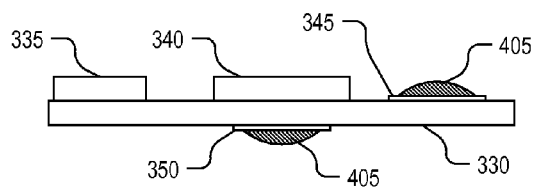
FIG. 5 is a profile view that illustrates connections between a ring substrate and flexible conductive electrodes within an eye-mountable device, in accordance with an embodiment of the disclosure.

FIGS. 4A-4C illustrate example orientations of ANT 315 and POST 320 within eye-mountable device 300, in accordance with an embodiment of the disclosure. FIG. 4A illustrates ANT 405 formed onto the concave inside surface of anterior layer 305, FIG. 4B illustrates a POST 410 formed onto the convex inside surface of POST 320, and FIG. 4C is a plan view illustration of a fully assembled eye-mountable device 300. FIG. 5 is a profile illustration of a portion of ring substrate 330 that forms electrical connections to connection tab 360 of ANT 315 and connection tab 365 of POST 320, in accordance with an embodiment of the disclosure.

In the illustrated embodiment, ANT 315 includes connection tab 360 for electrically connecting to anterior contact pad 345 disposed on the front side of ring substrate 330. Correspondingly, POST 320 includes connection tab 365 for electrically connecting to posterior contact pad 350 disposed on the backside of ring substrate 330. FIG. 5 illustrates the use of conductive adhesive 405 to improve the electrically connections between connection tabs 360 and 365 and contact pads 345 and 350, respectively. Conductive adhesive 405 may be implemented using a variety of different materials, such as, silver loaded epoxies, silicon, or polyurethane, or otherwise. Conductive adhesive 405 provides flexible, conductive adhesion that maintains electrical connection when the smart contact lens is bent or folded despite the different flexibility characteristics of the various constituent parts of eye-mountable device 300.

In the illustrated embodiment, connection tabs 360 and 365 are rotationally offset relative to each other to make room for a through-substrate via for one or both of contact pads 345, 365. For example, in the illustrated embodiment, power supply 335 and controller circuit 340 are disposed on the front side of ring substrate 330, thus posterior contact pad 350 is connected to controller circuit 340 using a through substrate via.

FIG. 4C further illustrates the contour 410 of LC layer 325. LC layer 320 is disposed between ANT 315 and POST 320 and is actuated by voltages applied across these electrodes by controller circuit 340. In the illustrated embodiment, LC layer 320 extends across a larger portion of the center region to ensure that ANT 315 and POST 320 do not short circuit to each other. In one embodiment, transparent insulating layers (e.g., polyimide) may be applied to separate LC layer 325 from ANT 315 and POST 320, while in other embodiments ANT 315 and POST 320 may form direct contact with LC layer 325. Furthermore, both LC layer 320 along with ANT 315 and POST 320 are contained within the inner radius of ring substrate 330 and do not contact the inner edge of ring substrate 330. In one embodiment, ANT 315 and POST 320 have a diameter of approximately 6 mm, LC layer 325 has a diameter of approximately 7 mm, and the inner edge of ring substrate 330, which defines the center region, has a diameter of 9 mm. The larger diameter of the inner edge of ring substrate 330 forms a gap between ANT 315 and POST 320 to prevent shorting to ring substrate 330. Of course, other dimensions may be implemented.

Figure 6:
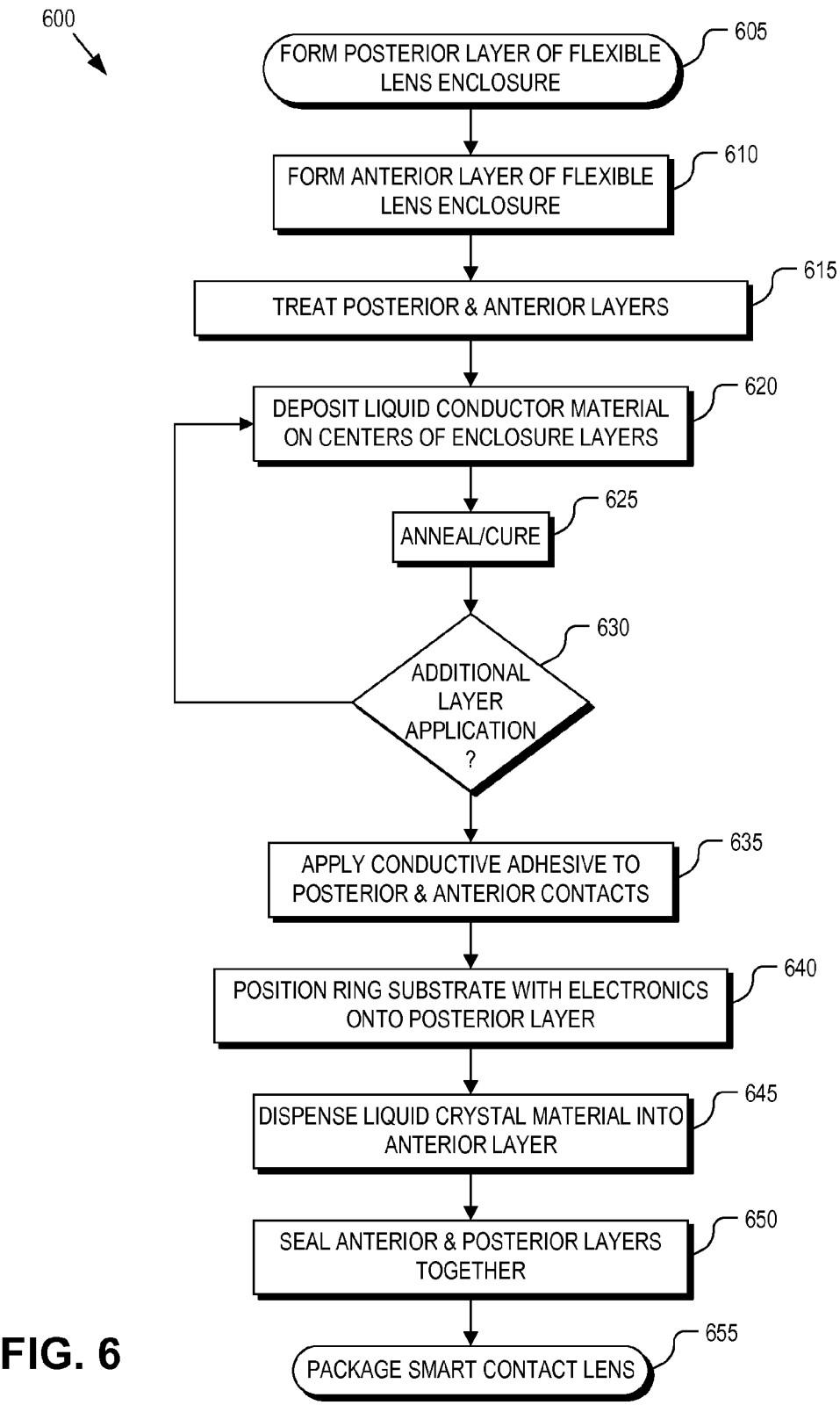
FIG. 6 is a flow chart illustrating a process for fabricating an eye-mountable device with a liquid crystal accommodation actuator controlled by two flexible conductive electrodes, in accordance with an embodiment of the disclosure.

FIG. 6 is a flow chart illustrating a process 600 for fabricating eye-mountable devices 100, 200, or 300, in accordance with an embodiment of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In process blocks 605 and 610, anterior layer 305 and posterior layer 310 are formed as separate layers of the flexible lens enclosure. Anterior layer 305 and posterior layer 310 may be formed using molds that are spray coated or injected with a flexible, transparent material. The flexible, transparent material may include any of a polymeric material, a hydrogel, PMMA, silicone based polymers (e.g., fluoro-silicon acrylate), or otherwise.

In a process block 615, anterior layer 305 and posterior layer 310 are treated to form reactive surfaces for improved bonding to the ANT 315 and POST 320. In one embodiment, anterior layer 305 and posterior layer 310 are plasma treated in a highly ionizing environment that causes the inside surfaces of anterior layer 305 and posterior layer 310 to be chemically reactive.

In a process block 620, liquid conductor material that forms ANT 315 and POST 320 is deposited onto the concave inside surface of anterior layer 305 and deposited onto the convex inside surface of posterior layer 310. In one embodiment, the deposition of the liquid conductor material may be spray coated over stencils that conform to the concave and convex surfaces. In yet another embodiment, the liquid conductive material is applied to stamps with curved surfaces that conform to the concave and convex surfaces of anterior layer 305 and posterior layer 310, respectively. The coated stamps are then pressed against the inside surfaces of anterior layer 305 and posterior layer 310 to transfer the ink pattern thereto. After application of the liquid conductor material, it is cured and/or annealed with heat (process block 625).

In an embodiment where the liquid conductor material is a colloidal solution of conductive particles (e.g., nanotubes or nanowires), the annealing can help the conductive particles to lay or mat-down thereby improving the conductive characteristic of ANT 315 and POST 320. Example commercially available materials for implementing the liquid conductor material include silver nanowires, carbon nanotubes, PEDOT:PSS, or otherwise. In some embodiments, various solvents (e.g., alcohol), surfactants, or dilutants may be added to the liquid conductor material to improve the uniform coating and adhesion of ANT 315 and POST 320 to anterior layer 305 and posterior layer 310, respectively.

In some embodiments, several layers of the liquid conductor material is iteratively applied and cured to build up the thickness of ANT 315 and POST 320 until a desired sheet resistance is achieved (decision block 630). These iterations may range from a single application to many applications (e.g., as many as 10 applications). However, one to four iterative application and curing/annealing steps are expected to be sufficient in many instances.

In a process block 635, conductive adhesive 405 is applied to contact pads 345 and 350 on ring substrate 330. Next, ring substrate 330, including power supply 335 and controller circuit 340, are positioned over the convex inside surface of posterior layer 310 with posterior contact pad 350 aligning to connection tab 365 on POST 320 (process block 640).

In a process block 645, the liquid crystal material is dispensed into the center region of the concave inside surface of anterior layer 305 and covers over ANT 315. In one embodiment, the liquid crystal material is dispensed over a larger area such that LC layer 325 covers a greater area than either ANT 315 or POST 320.

In a process block 650, the two halves (anterior layer 305 and posterior layer 310) of the flexible lens enclosure are pressed together and sealed. When mating the two halves, care is taken to ensure alignment between anterior connection tab 360 and anterior contact pad 345. In one embodiment, additional flexible enclosure material is added to the bottom edge or rim of the mated anterior layer 305 and posterior layer 310 to form the seal. Finally, the eye-mountable device or smart contact lens is packaged into a sealed container of lens solution for distribution.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A device, comprising:
   a lens enclosure including an anterior layer and a posterior layer that are sealed together;
   an anterior conductive electrode formed on a concave side of the anterior layer of the lens enclosure and across a center region of the lens enclosure;
   a posterior conductive electrode formed on a convex side of the posterior layer of the lens enclosure and across the center region; and
   an accommodation actuator element disposed between the anterior and posterior conductive electrodes in the center region,
   wherein the anterior and posterior conductive electrodes are transparent and electrically manipulate the accommodation actuator element via a voltage applied across the anterior and posterior conductive electrodes, and
   wherein the anterior and posterior conductive electrodes include metal nanowires.

2. The device of claim 1, wherein a concave surface of the posterior layer is configured to be removeably mounted over a cornea and a convex surface of the anterior layer is configured to be compatible with eyelid motion when the concave surface of the posterior layer is so mounted.

3. The device of claim 1, wherein the anterior and posterior conductive electrodes conform to the anterior layer and the posterior layer, respectively.

4. The device of claim 1, wherein the metal nanowires included on the anterior and posterior conductive electrodes are disposed in a colloidal suspension that is cured onto the concave side of the anterior layer and onto the convex side of the posterior layer, respectively.

5. The device of claim 4, wherein the metal nanowires are silver nanowires.

6. The device of claim 1, further comprising:
   a ring substrate disposed around the center region,
   wherein the anterior conductive electrode includes an anterior connection tab extending outside the center region and overlapping an anterior contact pad on the ring substrate,
   wherein the posterior conductive electrode includes a posterior connection tab extending outside the center region and underlapping a posterior contact pad on the ring substrate.

7. The device of claim 6, further comprising:
   first conductive adhesive disposed between the anterior connection tab and the anterior contact pad to electrically connect the anterior conductive electrode to the anterior contact pad; and
   second conductive adhesive disposed between the posterior connection tab and the posterior contact pad to electrically connect the posterior conductive electrode to the posterior contact pad.

8. The device of claim 6, wherein the anterior connection tab and the posterior connection tab are rotationally offset from each other.

9. The device of claim 1, wherein the accommodation actuator element comprises a liquid crystal ("LC") layer and wherein the LC layer extends across a larger area in the center region than the anterior and posterior conductive electrodes.

10. The device of claim 1, wherein the anterior and posterior conductive electrodes each comprise multi-layer structure of transparent, conductive liquid that is iteratively applied and cured.

11. A method of fabricating a contact lens having a lens enclosure, comprising:
    depositing a liquid conductor material onto a concave inside surface of an anterior layer of the lens enclosure, wherein the liquid conductor includes metal nanowires;
    depositing the liquid conductor material onto a convex inside surface of a posterior layer of the lens enclosure, wherein the liquid conductor includes metal nanowires;
    curing the liquid conductor material on the anterior and posterior layers to form an anterior conductive electrode disposed on the concave inside surface and a posterior conductive electrode disposed on the convex inside surface, respectively, wherein the anterior and posterior conductive electrodes are both transparent;
    dispensing liquid crystal material between the anterior and posterior conductive electrodes; and
    sealing the anterior layer to the posterior layer to encase anterior and posterior flexible conductors and the liquid crystal material within the lens enclosure of the contact lens.

12. The method of claim 11, wherein the metal nanowires are in a colloidal suspension that conforms to the concave inside surface and the convex inside surface, respectively.

13. The method of claim 12, wherein the metal nanowires are silver nanowires.

14. The method of claim 11, further comprising:
    iteratively depositing and curing the liquid conductor material on each of the concave inside surface and the convex inside surface to build up thicknesses of the anterior and posterior conductive electrodes to achieve desired sheet resistances.

15. The method of claim 11, wherein deposing the liquid conductive material onto the convex inside surface comprises:
    positioning a stencil over the convex inside surface of the anterior layer; and
    spraying the liquid conductive material over the stencil onto the convex inside surface of the anterior layer.

16. The method of claim 11, wherein depositing the liquid conductive material onto the convex inside surface comprises:
    applying the liquid conductive material to a stamp; and
    pressing the stamp to the convex inside surface of the anterior layer to transfer the liquid conductive material to the convex inside surface of the anterior layer.

17. The method of claim 11, wherein the liquid crystal material is dispensed over a larger area in a center region of the lens enclosure than the anterior and posterior flexible conductive electrodes.

18. The method of claim 11, further comprising:
    plasma treating the anterior and posterior layers of the lens enclosure prior to the depositing the liquid conductor material onto the concave inside surface of the anterior layer and prior to depositing the liquid conductor material onto the convex inside surface of the posterior layer to form reactive surfaces for bonding the anterior and posterior conductive electrodes to the anterior and posterior layers, respectively.

19. The method of claim 11, further comprising:
    providing a ring substrate upon which a battery, a controller circuit, an anterior contact pad, and a posterior contact pad are disposed;

dispensing a conductive adhesive onto the anterior and posterior contact pads;

positioning the ring substrate on the posterior layer surrounding the posterior conductive electrode; and bonding connection tabs extending from the anterior and posterior conductive electrodes to the anterior and posterior contact pads, respectively.

20. The device of claim 6, wherein the ring substrate has a flat, circular ring shape that provides a platform for mounting electronics and for patterning conductive materials to form electrodes, antenna, and interconnections.

21. The method of claim 11, further comprising:

mating the anterior layer of the lens enclosure and the posterior layer of the lens enclosure, and wherein the sealing the anterior layer to the posterior layer to encase anterior and posterior conductors and the liquid crystal material within the lens enclosure of the contact lens comprises:

adding additional lens enclosure material to a rim of the mated anterior and posterior layers of the lens enclosure.

\* \* \* \* \*